US 6,732,136 B1

(12) United States Patent
Chen et al.

(10) Patent No.: US 6,732,136 B1
(45) Date of Patent: May 4, 2004

(54) DIFFERENTIAL, LOW VOLTAGE SWING REDUCER

(75) Inventors: Feng Chen, Portland, OR (US); Thomas Fletcher, Portland, OR (US); Shahram Jamshidi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,201

(22) Filed: Dec. 23, 1999

(51) Int. Cl.$^7$ ................................. G06F 7/50
(52) U.S. Cl. ............................... 708/708
(58) Field of Search ................. 708/708, 705, 708/709

(56) References Cited

U.S. PATENT DOCUMENTS

| | | | | |
|---|---|---|---|---|
| 5,491,653 A | * | 2/1996 | Taborn et al. | 708/625 |
| 5,568,069 A | | 10/1996 | Wai | |
| 5,615,140 A | * | 3/1997 | Ishikawa | 708/518 |
| 6,308,195 B1 | * | 10/2001 | Hirase et al. | 708/629 |
| 6,345,286 B1 | * | 2/2002 | Dhong et al. | 708/629 |
| 6,405,298 B1 | * | 6/2002 | Zeng | 708/708 |

FOREIGN PATENT DOCUMENTS

| EP | 0 653 702 | 5/1995 |
|---|---|---|
| WO | PCT/US00/42397 | 9/2000 |

OTHER PUBLICATIONS

Kazuo, Yano et al: "A 3.8–NS CMOS 16×16–B Multiplier Using Complementary Pass–Transistor Logic", IEEE Journal of Solid–State Circuits, IEEE Inc. New York, US, vol. 25, No. 2, Apr. 1, 1990. pp. 388–395.

Fuse, T. et al: "An Ultra Low Voltage SOI CMOS Pass–Gate Logic", IEICE Transactions on Electronics, Institute of Electronics Information and Comm. Eng. Tokyo, FP, vol. E80–C, No. 3, Mar. 1, 1997, pp. 472–477, XP000751697, ISSN: 0916–8524, figure 3A.

Cheng, et al: "A suggestion for low–power current–sensing complementary pass–transistor logic interconnection" 1997 ISCAS, Jun. 1997, pp. 1948–1951, XP002179278, Hong Kong, figures 9, 10.

* cited by examiner

*Primary Examiner*—David H. Malzahn
(74) *Attorney, Agent, or Firm*—Blakely, Sokoloff, Taylor & Zafman LLP

(57) ABSTRACT

A small swing reducer circuit. An apparatus includes a first number of input terminals including at least two input terminals coupled to receive a differential small swing signal and a reducer circuit to generate differential, small swing sum and carry output signals based on data received via the input terminals.

28 Claims, 6 Drawing Sheets

DIFFERENTIAL, LOW VOLTAGE SWING REDUCER

BACKGROUND

1. Field

An embodiment of the present invention relates to the field of integrated circuits and, more particularly to a low voltage swing reducer circuit such as a 3 to 2 reducer.

2. Discussion of Related Art

Reducer circuits reduce a first number of input signals to a second smaller number of output signals. 3 to 2 reducer circuits, for example, receive three vectors, perform a local bit wise sum and carry generation, and provide the resulting SUM and CARRY vectors as outputs. Typically, if each of the input vectors is a 32-bit vector, for example, 32 3 to 2 reducer circuits are used to perform the reduction and produce the resulting SUM and CARRY vectors. Thus, a 3 to 2 reducer that receives input vectors X, Y and Z operates according to the following equations:

$$SUM(i) = X(i) \text{ XOR } Y(i) \text{ XOR } Z(i)$$

$$CARRY(i) = X(i)*Y(i) + Y(i)*Z(i) + X(i)*Z(i)$$

where i is the particular bit of the vector being evaluated, '+' indicates a logical OR function and '*' indicates a logical AND function.

Reducer circuits are widely used in digital design to reduce the number of vectors to be added. Where many vectors are to be added, multiple 3 to 2 reducer circuits, for example, may be cascaded. To cascade two 3 to 2 reducers, the CARRY output of a first 3 to 2 reducer is left-shifted and provided as an input to a second 3 to 2 reducer. The SUM output of the first 3 to 2 reducer and a new vector are also provided to the second 3 to 2 reducer. The second 3 to 2 reducer then produces SUM and CARRY output signals based on the input vectors.

Prior 3 to 2 reducer circuits have typically been implemented in static complementary metal oxide semiconductor (CMOS) logic. As shown in FIG. 6, a typical static CMOS implementation uses at least two stages (because the XOR function is not straightforward in static CMOS) and thus, may involve multiple gate delays. Where multiple 3 to 2 reducers are cascaded, with the high-speed requirements of today's integrated circuit devices, such a delay may be unacceptable. Further, static CMOS logic may consume an undesirable amount of area and power.

Additionally, if the input vectors to either single or cascaded 3 to 2 reducers arrive at different times, the design may become unduly complicated.

SUMMARY OF THE INVENTION

In accordance with one aspect of the invention, an apparatus includes a first number of input terminals including at least two input terminals coupled to receive a differential, small swing signal. A reducer circuit to generate differential, small swing sum and carry output signals based on data received via the input terminals is also included.

Other features and advantages of various embodiments of the present invention will be appreciated from the accompanying drawings and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A differential, low voltage swing reducer is described. In the following description, particular integrated circuits and circuit configurations are described for purposes of illustration. It will be appreciated, however, that other embodiments are applicable to other types of integrated circuits and to circuits configured in another manner.

In describing the embodiments below, the terms differential voltage, differential voltage signal and differential signal may be used interchangeably. At some set of two nodes within a circuit, a differential signal is a set of two voltages {v, v#} at the two nodes where v>v# indicates a logical 1 value and v#>v represents a logical 0 value. For the embodiments described below, one of the two voltages may be at ground (or substantially at ground), which may be taken to be zero volts. The differential signals described herein include both small swing differential signals (also referred to herein as a low voltage swing differential signals) and full-swing (i.e. rail-to-rail) differential signals.

Full swing signals, as the term is used herein, are rail-to-rail signals that typically have a voltage swing equal to the difference between a high supply voltage and a low supply voltage for the surrounding circuitry. Thus, if an integrated circuit device has a Vcc of 1.8 volts, for example, a full swing signal alternates between ground and Vcc and thus, has a voltage swing of 1.8 volts.

Small swing signals, as the term is used herein, refer to signals with a smaller voltage swing than that of full swing signals. In some cases, the voltage swing may be substantially smaller than that of full swing signals. For one implementation of the reducer circuit described below, for example, the small swing signals may have a voltage swing as low as 100 mV or, in some cases, even lower. The use of differential signals in the various embodiments is described in more detail below.

Figure 1:
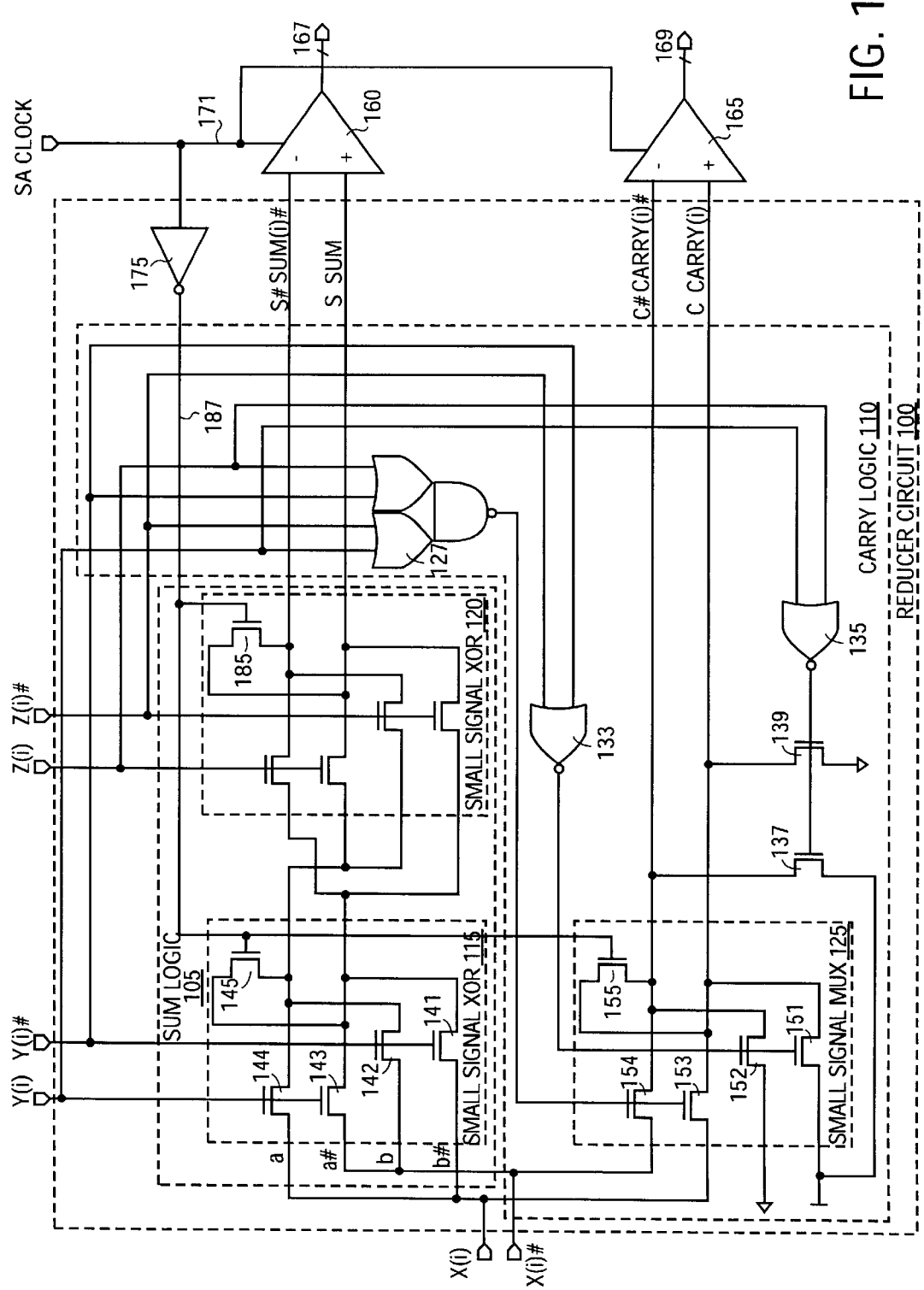
FIG. 1 is a schematic diagram illustrating a reducer circuit of one embodiment.

FIG. 1 is a schematic diagram of a 3 to 2 reducer circuit 100 of one embodiment. The 3 to 2 reducer circuit 100 includes SUM logic 105 and CARRY logic 1110. The SUM logic 105 includes two small signal XOR cells 115 and 120, each of which implements an XOR function using pass gates.

The carry logic 1110 includes a small signal multiplexer (mux) cell 125, combinatorial logic including an OR-AND-INVERT gate 127 and NOR gates 133 and 135, and transistors 137 and 139. For one embodiment, the combinatorial logic is full swing static CMOS logic and the transistors 133 and 135 are n-channel metal oxide semiconductor field effect transistors (MOSFETS). For other embodiments, however, different types of transistors may be used and the combinatorial logic may be implemented using different types of logic gates to achieve a similar function.

In the description that follows, each of X(i), Y(i) and Z(i) represent one bit in the ith position of a respective vector X, Y or Z. Thus, while one reducer circuit 100 is shown in FIG. 1 for purposes of illustration, if the vectors to be reduced include n bits, n reducer circuits similar to the reducer circuit 100 may be used.

Before describing the overall operation of the reducer circuit 100, it is useful to describe the small signal XOR cells 115 and 120 of one embodiment in more detail. The small signal XOR cell 115 is referred to for purposes of explanation. It will be appreciated, however, that the description below also applies to the small signal XOR cell 120. For one embodiment, the small signal XOR cell 115 is implemented using five pass gates 141–145. The pass gates 141–145 of one embodiment are MOSFETs, but may be another type of transistor, including another type of field effect transistor (FET), for other embodiments.

The small signal XOR cell 115 receives small swing differential input signals X(i) and X(i)# (also referred to as a differential signal pair) at input terminals a, a#, b and b# as shown in FIG. 1. The pass gates 141–144 are controlled by full swing differential signals Y(i) and Y(i)# that are received at select terminals sa and sb as shown. Full swing signals Y(i) and Y(i)# may be received from a prior full swing logic stage (not shown).

Small swing signals X(i) and X(i)# may be generated from full swing signals by preceding logic (not shown) through the use of a particular pulsed clocking scheme, for example, that only allows a small amount of time for signal development. Further, or alternatively, small swing signals X(i) and X(i)# may be received from logic that is relatively far away from the inputs to the small swing reducer circuit 100 of one embodiment such that, by the time the signals are received by the reducer circuit inputs, their driving strength is relatively low. Other approaches to generating small swing signals may also be used to provide the small swing signals X(i) and X(i)# of various embodiments.

In operation, if a logic 1 signal is indicated by differential input signals X(i) and X(i)# (i.e. X(i)>X(i)#) and a logic 0 signal is indicated by differential signals Y(i) and Y(i)# (i.e. Y(i)#=Vcc and Y(i)=0), pass gates 142 and 141 are enabled. In this manner, the small swing differential signals X(i) and X(i)# are provided at the output terminals o and o#, respectively, such that a logic 1 is indicated at the output of the XOR cells 115.

In another example, if, instead, a logic 1 is indicated by the differential signals Y(i) and Y(i)#, pass gates 143 and 144 are enabled such that the small swing differential signals X(i) and X(i)# are passed to the output terminals o# and o, respectively. In this manner, if a logic 1 is also indicated by X(i) and X(i)#, a logic 0 is indicated at the outputs o# and o of the small signal XOR cell 115. The small signal XOR cell 115 operates in a similar manner to provide an XOR logic function for other logic value combinations indicated by small swing differential input signals X(i), X(i)# and full swing select signals Y(i) and Y(i)# (also referred to herein as control signals).

The small signal mux cell 125 is constructed in a similar manner to the small signal XOR cells 115 and 120, but logically operates as a mux instead of an XOR cell due the manner in which the inputs to the cell are connected. Examples of the logical operation of the small signal mux cell 125 are discussed below in the description of the carry logic 110.

Referring back to the small signal XOR cell 115, the pass gate 145 is referred to herein as an equalizer gate or equalizer device. The equalizer device 145 is included to equalize internal nodes of the small signal XOR cell 115 such that the voltage differential between the output terminals o and o# is substantially 0 soon after data is sensed at output terminals of the reducer circuit 100. This equalization process may prevent erroneous data from being provided at output terminals of the small signal XOR cell 115 since even small signal differentials on the output terminals may be sensed by succeeding logic. Control of the equalizer device 145 and similar equalizer devices of the small signal XOR cell 120 and the small signal mux cell 125 is described in more detail below.

In operation, the sum logic 105 operates according to the equation SUM(i)=X(i) XOR Y(i) XOR Z(i) to provide small swing differential signals SUM(i) and SUM(i)# at output terminals s and s#, respectively, of the reducer circuit 100. The small signal XOR cell 115 performs the X(i) XOR Y(i) function as described above, while the small signal XOR cell 120 performs an XOR function on the result of the first XOR function and Z(i) in a similar manner. A differential signal is provided at output terminals of the sum logic 110 in the form of SUM and SUM# signals as shown.

The operation of the CARRY logic 110 is described by the equation CARRY(i)=X(i)*Y(i)+Y(i)*Z(i)+X(i)*Z(i) to provide small swing differential signals CARRY(i) and CARRY(i)# at output terminals c and C#, respectively, of the reducer circuit 100 as shown in FIG. 1. Examples of different logic value combinations of X(i), Y(i) and Z(i) signals are provided below to illustrate the operation of the carry logic 110.

In a first example, Y(i) and Z(i) differential signals indicate a logic 0 (or low logic value) and a logic 1 (or high logic value), respectively. The OR-AND-INVERT gate 127 is coupled to receive Y(i), Z(i)#, Y(i)# and Z(i) signals as shown. Thus, the output of the OR-AND-INVERT gate 127 is 1. When the output of the OR-AND-INVERT gate 127 is high, pass gates 153 and 154 of the small signal mux cell 125 are enabled to pass the input signals X(i) and X(i)# to the output terminals c and c#, respectively as CARRY(i) and CARRY(i)# signals. In this manner, when X(i) and X(i)# indicate a logic 0, for example, a logic 0 is indicated by the CARRY(i) and CARRY(i)# signals.

In a second example, Y(i) and Z(i) differential signals both indicate a logic 1. NOR gate 133 is coupled to receive Z(i)# and Y(i)# signals. In this example, then, an output of the NOR gate 133 is high such that pass gates 151 and 152 are enabled. One terminal of the pass gate 151 is tied to a supply voltage such as Vcc, while one terminal of the pass gate 152 is tied to a ground supply voltage. In this manner, when pass gates 151 and 152 are enabled, the voltage of the CARRY(i) signal is higher than that of the CARRY(i)# signal at terminals c and c# and thus, a logic 1 is indicated.

In a third example, Y(i) and Z(i) differential signals both indicate a logic 0. NOR gate 135 is coupled to receive Y(i) and Z(i) signals. Thus, for this example, an output of the NOR gate 135 is high such that transistors 137 and 139 are turned on. Transistor 137 has one terminal tied to the Vcc supply voltage, for example, while transistor 139 has one terminal tied to the ground supply voltage. In this manner, when transistors 137 and 139 are turned on, the differential CARRY(i) and CARRY(i)# signals indicate a logic 0.

The carry logic 110 operates in a similar manner for other logic value combinations of X(i), Y(i) and/or Z(i) according to the above equation to provide small swing CARRY(i) and CARRY(i)# signals.

For one embodiment, sense amplifiers (sense amps) 160 and 165 are coupled to receive the differential SUM and CARRY signals, respectively. The sense amps 160 and 165 are provided to recover the differential small swing SUM and CARRY signals and provide corresponding full swing output signals at terminals 167 and 169, respectively, that may be received by succeeding full swing logic (not shown).

The sense amps 167 and 169 of one embodiment are controlled by a sense amp (SA) enable clock signal that is received by the sense amps 167 and 169 over the signal line 171. For one embodiment, sense amps 167 and 169 are both enabled on a falling edge of the SA enable clock signal to sense data on the corresponding input lines.

For one embodiment, an inverter 175 is also coupled to receive the SA enable clock signal and provide an inverted SA enable clock signal at its output terminal. The inverted SA enable clock signal is used as an equalization signal. The gates of each of the equalizer devices 145, 185 and 155 in the small signal XOR cells 115 and 120 and the small signal mux 125, respectively, are coupled to receive the equalization signal over the signal line 187 as shown in FIG. 1. The equalizer devices 145, 185 and 155 are enabled on a rising edge of the equalization signal. In the configuration of FIG. 1, this rising edge occurs one inverter delay (the delay through inverter 175) after the sense amps 160 and 165 are enabled. As described above, when enabled, the equalizer devices 145, 185 and 155 equalize the voltage on the output nodes o and o# of the respective small signal cells 115, 120 and 125 such that erroneous data is not sensed in a subsequent sensing cycle. Because the voltage swing on the output nodes o and o# is small, equalization of the nodes can be accomplished quickly.

In designing the reducer circuit 100, several factors may be taken into consideration in determining the sizes of the various devices included in the circuit 100. The pass gates of the small signal XOR cells 115 and 120 and the small signal mux 125 may be quite small as compared to typical gates used in full swing static CMOS logic, for example, because they do not need to provide much driving strength. The sizes of the pass gates may be selected to balance factors such as power consumption and desired speed of the circuit.

If the pass gates are too small, they may slow down the circuit by slowing down signal transitions through the gates. Thus, the size of the sense amps 160 and 165 that receive the signals from the pass gates should be taken into account. If the pass gates are too large, however, they may provide excessive load on the bus drivers that provide input signals to the pass gates. The sizes of the pass gates also depend on the particular processing technology used to form the gates as well as other factors.

For one embodiment, the pass gates are selected to be about $\frac{1}{5}$ the size of the transistors used in the sense amps 160 and 165 to strike a balance between drive strength driving the sense amps 160 and 165 and load on the bus drivers. Where the reducer circuit 100 is at the end of a low voltage swing logic chain, such as in the example described below in reference to FIG. 3, the pass gates may be particularly small because they will have little effect on the delay of the overall logic chain.

The sizes of the equalizer devices 145, 185 and 155 may depend on the selected sizes for the pass gates. For one embodiment, the equalizer devices 145, 185 and 155 are sized to be large enough to equalize internal nodes of the respective small swing cell before a next sensing cycle while being small enough to avoid placing an excessive load on the differential outputs of the cell.

The full swing CMOS gates included in the combinatorial logic of the carry logic 110 may be sized to meet particular speed requirements. Other factors may also be considered in determining the sizes of the full swing CMOS gates.

While a 3 to 2 reducer circuit 100 is shown in FIG. 1 and described above, the circuit 100 may also be modified to provide a 4 to 2 reducer circuit. This may be accomplished, for example, by cascading an additional small signal XOR cell at the outputs of the XOR cell 120 in the sum logic 105 and by reconfiguring the carry logic 110 using different combinatorial logic to control the pass gates of the XOR cell 125. Where the four input vectors are W, X, Y and Z for example, the reconfigured carry logic for a 4 to 2 reducer circuit that reduces the ith bit of the vectors operates according to the equation $W(i)*X(i)+W(i)*Y(i)+W(i)*Z(i)+X(i)*Y(i)+X(i)*Z(i)+Y(i)*Z(i)$.

It will be appreciated that, for other embodiments, complementary logic and/or different combinatorial logic configurations may be used to implement a circuit that performs a similar function to the circuit 100 of FIG. 1.

Figure 2:
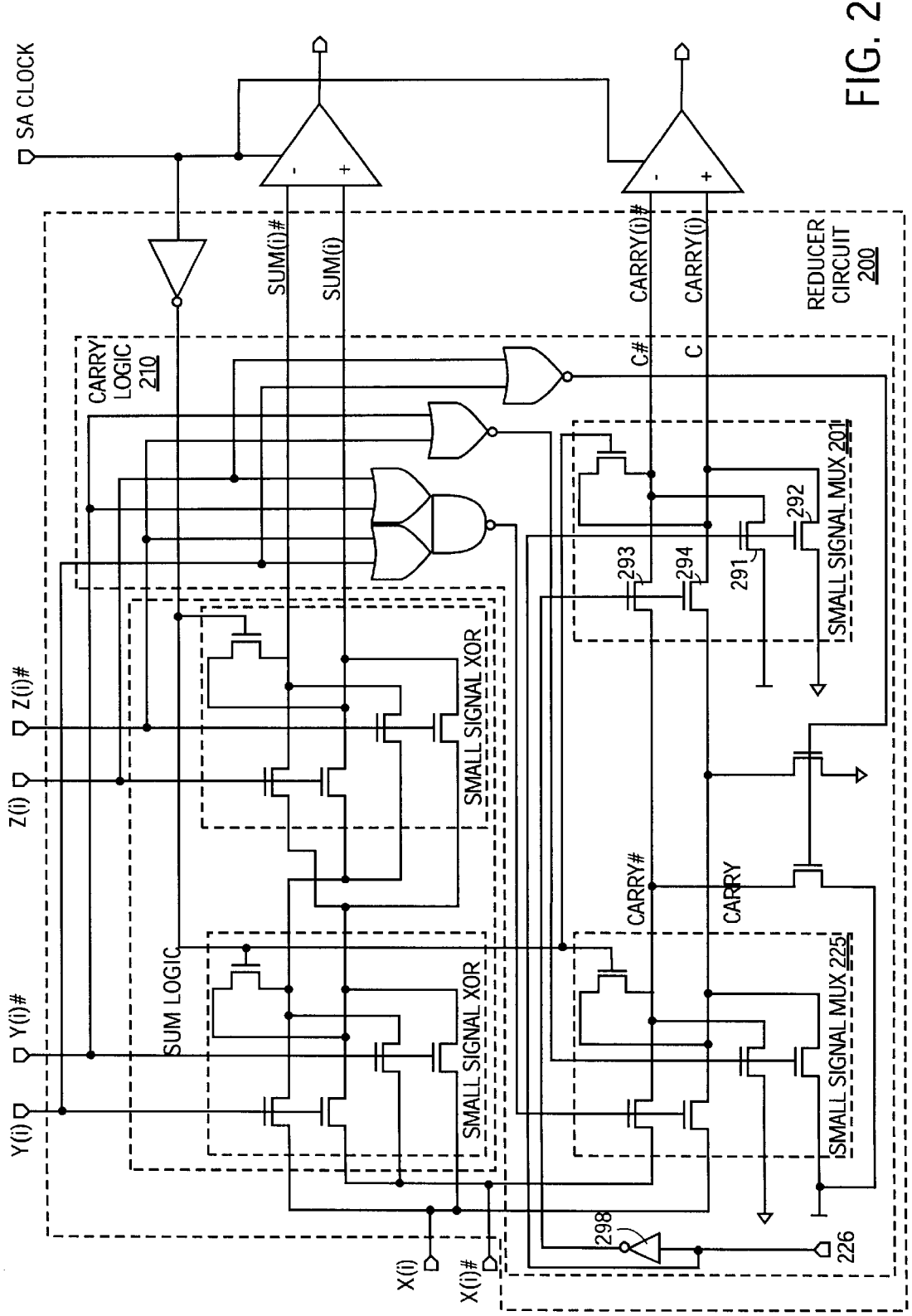
FIG. 2 is a schematic diagram illustrating a reducer circuit of one embodiment with kill carry capability.

FIG. 2 is a schematic diagram of a 3 to 2 reducer 200 of another embodiment. The 3 to 2 reducer 200 is similar in structure and operates in a manner similar to the reducer circuit 100 of FIG. 1, except the 3 to 2 reducer circuit 200 includes kill carry logic. To provide the kill carry capability for one embodiment, the kill carry logic includes an additional small signal mux cell 201 that is cascaded with the small signal mux cell 225 in the carry logic 210, which, otherwise, may be identical to the carry logic 110 of FIG. 1. The small signal mux cell 201 has its inputs coupled in a different manner than the small signal mux cell 225 as shown in FIG. 2 and described below. The small signal cells of FIG. 2 may be identical in structure and function to the corresponding small signal XOR cells described above in reference to FIG. 1.

In operation, a kill carry signal at an input 226 is received at gate terminals of pass gates 291 and 292 in the small signal mux cell 201 while the complement of the kill carry signal is received through an inverter 298 at pass gates 293 and 294. If the kill carry signal is not asserted (the kill carry signal is active high in this example), pass gates 293 and 294 are enabled while pass gates 291 and 292 are not enabled. When pass gates 293 and 294 are enabled, CARRY(i) and CARRY(i)# signals at the outputs of small signal XOR cell 225 are passed to reducer circuit 200 output terminals c and c#, respectively, as described above in reference to FIG. 1.

If the kill carry signal received at the input 226 is instead asserted, pass gates 291 and 292 are enabled while pass gates 293 and 294 are not enabled. In this manner, the CARRY(i) and CARRY(i)# signals at output terminals of the small signal mux cell 225 are blocked from being transmitted to reducer circuit 200 output terminals c and c#, respectively. One terminal of pass gate 292 is tied to ground while one terminal of pass gate 291 is tied to a positive supply voltage such as Vcc. Thus, when pass gates 291 and 292 are enabled in response to the kill carry signal being asserted, the small signal differential CARRY output signal at the terminals c and c# indicates a logical 0. This is true regardless of what may have been indicated by the differential CARRY signal at the outputs of the small signal mux cell 225. In this manner, the CARRY signal is effectively killed.

Such kill carry capability may be useful, for example, where different vector sizes are processed by the same circuitry in different modes. If both 16-bit and 32-bit address vectors are reduced by a reducer circuit similar to the reducer circuit 200, for example, it may be desirable, in the 16-bit mode, to block the carry for the upper 16 bits of the 32-bit circuitry. As described above, the kill carry logic of FIG. 2 can be used for this purpose.

The kill carry logic of FIG. 2 is advantageous in that only one pass gate delay is added to provide this kill carry capability. Prior kill carry circuits for full swing CMOS logic, for example, add at least one AND gate such that the delay may be greater.

For another embodiment, regenerate logic may be provided in a similar manner by instead tying one terminal of the pass gate 291 to ground and one terminal of the pass gate 292 to a positive supply voltage such as Vcc. In this manner, when a regenerate signal is asserted on an input, such as the input 226, the differential small swing CARRY output signal at the output terminals c and c# may indicate a 1 regardless of the value indicated by the differential CARRY output signal at the outputs of the small signal mux cell 225. This action is referred to as regenerating a CARRY signal.

Figure 3:
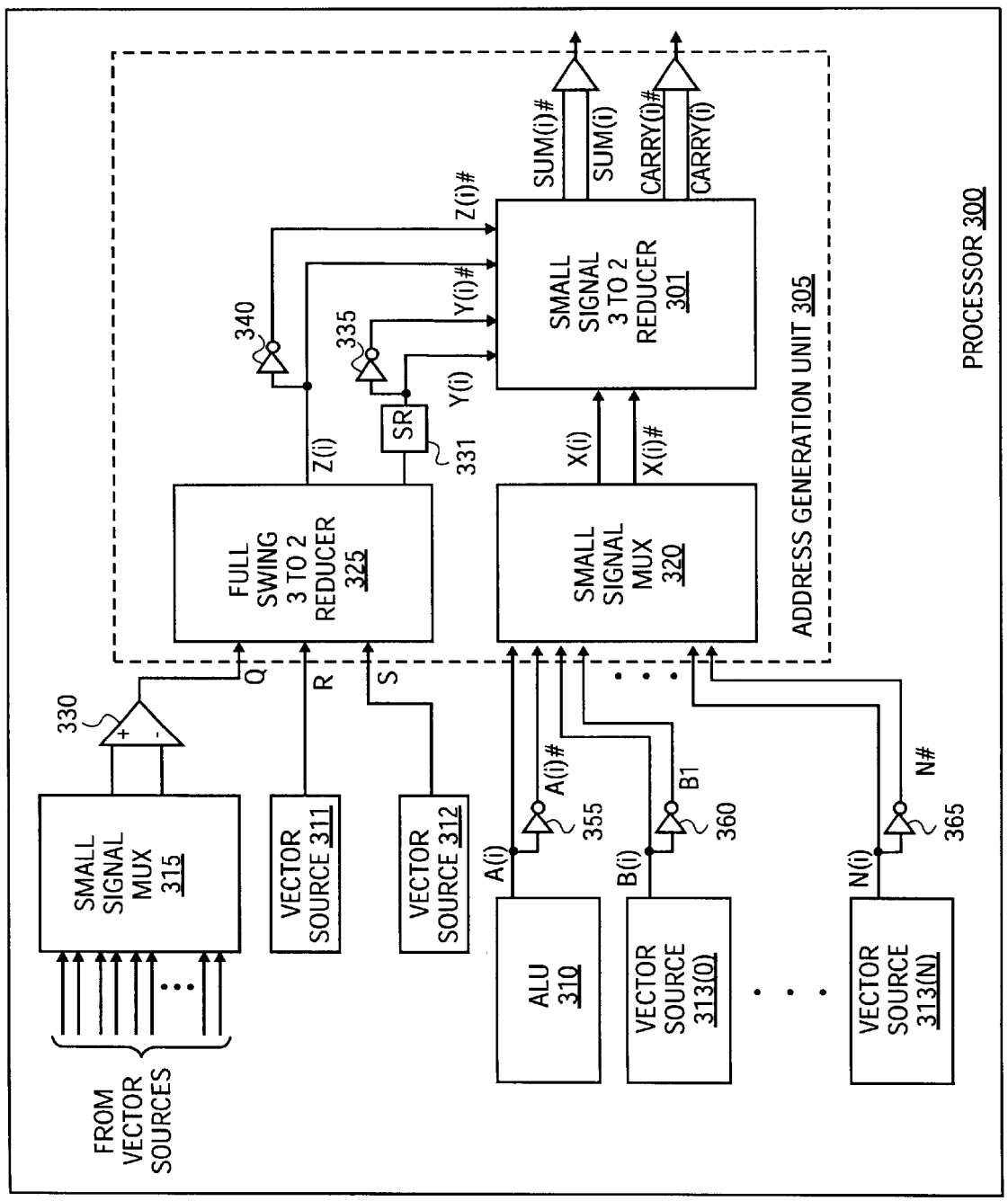
FIG. 3 is a block diagram of a processor including a reducer circuit similar to one of the reducer circuits of FIGS. 1 and 2.

FIG. 3 is a block diagram of a processor 300 of one embodiment that may advantageously include a 3 to 2 reducer circuit 301 that is similar to the 3 to 2 reducer circuit 100 of FIG. 1 or to the 3 to 2 reducer circuit 200 of FIG. 2, for example. The processor 300 includes an address generation unit (AGU) 305, an arithmetic logic unit (ALU) 310, various other vector sources 311, 312 and 313(0 . . . n) (where n may be any number), and a small signal multiplexer (mux) 315. The AGU 305 includes the small signal 3 to 2 reducer 300, another small signal mux 320 and a full swing 3 to 2 reducer 325.

Figure 4:
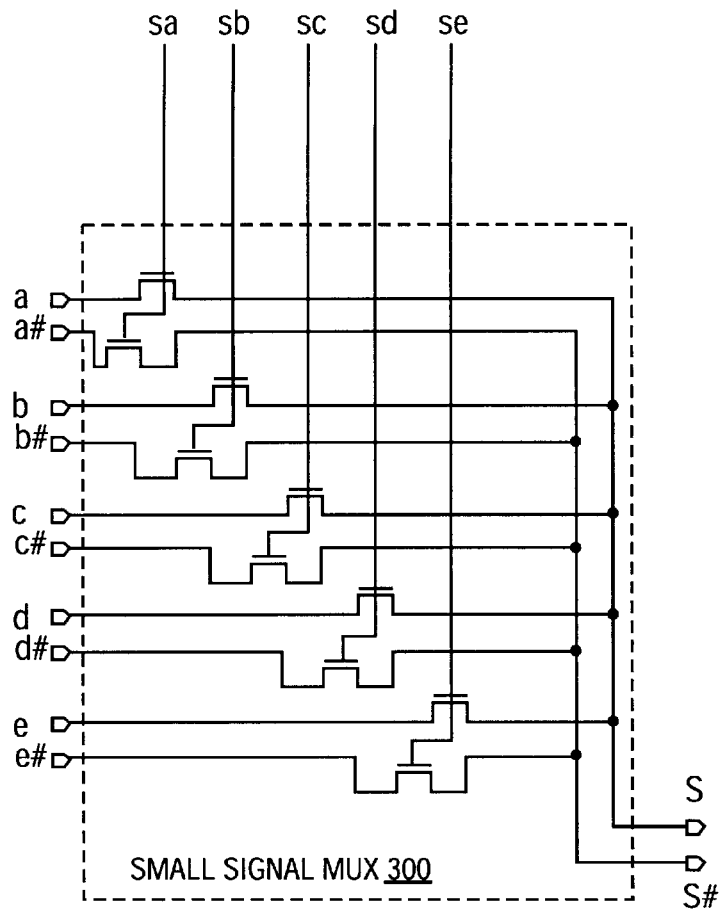
FIG. 4 is a schematic diagram of a small signal multiplexer (mux) that may be used in the processor of FIG. 3.

The small signal muxes 315 and 320 of one embodiment may be implemented in a similar manner to the mux 400 shown in FIG. 4. The mux 400 receives 5 differential small swing input signal pairs (a,a#, b,b#, c,c#, d,d# and e,e#) and provides one differential small swing output signal pair (s,s#) in response to control signals sa, sb, sc, sd and se. The control signals may be generated by a control unit (not shown), for example, in response to various processor conditions. The differential small swing input signal pairs may be received from preceding low voltage swing logic (not shown) or from full swing logic that is relatively far away, for example. It will be appreciated that the mux 400 of FIG. 4 may be configured in a different manner and/or receive a different number of differential input signal pairs.

Referring back to FIG. 3, for one embodiment, the processor 300 is an IA-32 architecture processor such as many processors provided by Intel Corporation of Santa Clara, Calif. The AGU 305 of this embodiment combines four address vectors with different arrival times to generate a final linear address that may, for example, indicate a memory location to be accessed in response to a particular instruction. For this example, the address vector sources 311 and 312 may include, for example, an instruction queue and/or a segment register file and the address vector sources 313 (0 . . . n) may include, for example, another ALU and/or another type of register file. Additional vector sources (not shown) may be selectively coupled to the full swing 3 to 2 reducer 325 through the small signal mux 315.

As in the above description, the example below is described with reference to the ith bit of vectors to be reduced. It will be appreciated that circuitry that operates on single bits in the description below is replicated for each bit of the vectors to be reduced.

In operation, in the example shown in FIG. 3, the full swing 3 to 2 reducer 325 receives portions of three vectors Q(i), R(i) and S(i): one from the small signal mux 315 (Q(i)), and one each from the vector sources 311 and 312 (R(i) and S(i). A small swing differential output signal from the small signal mux 315 may be recovered and provided as a full swing output signal using a sense amplifier 330.

The full swing 3 to 2 reducer operates according to the equations above for the small signal 3 to 2 reducer to provide a full swing SUM signal (Z(i)) at one output terminal and a full swing CARRY signal Y'(i) at another output terminal. The full swing 3 to 2 reducer may be implemented in any manner.

Figure 7:
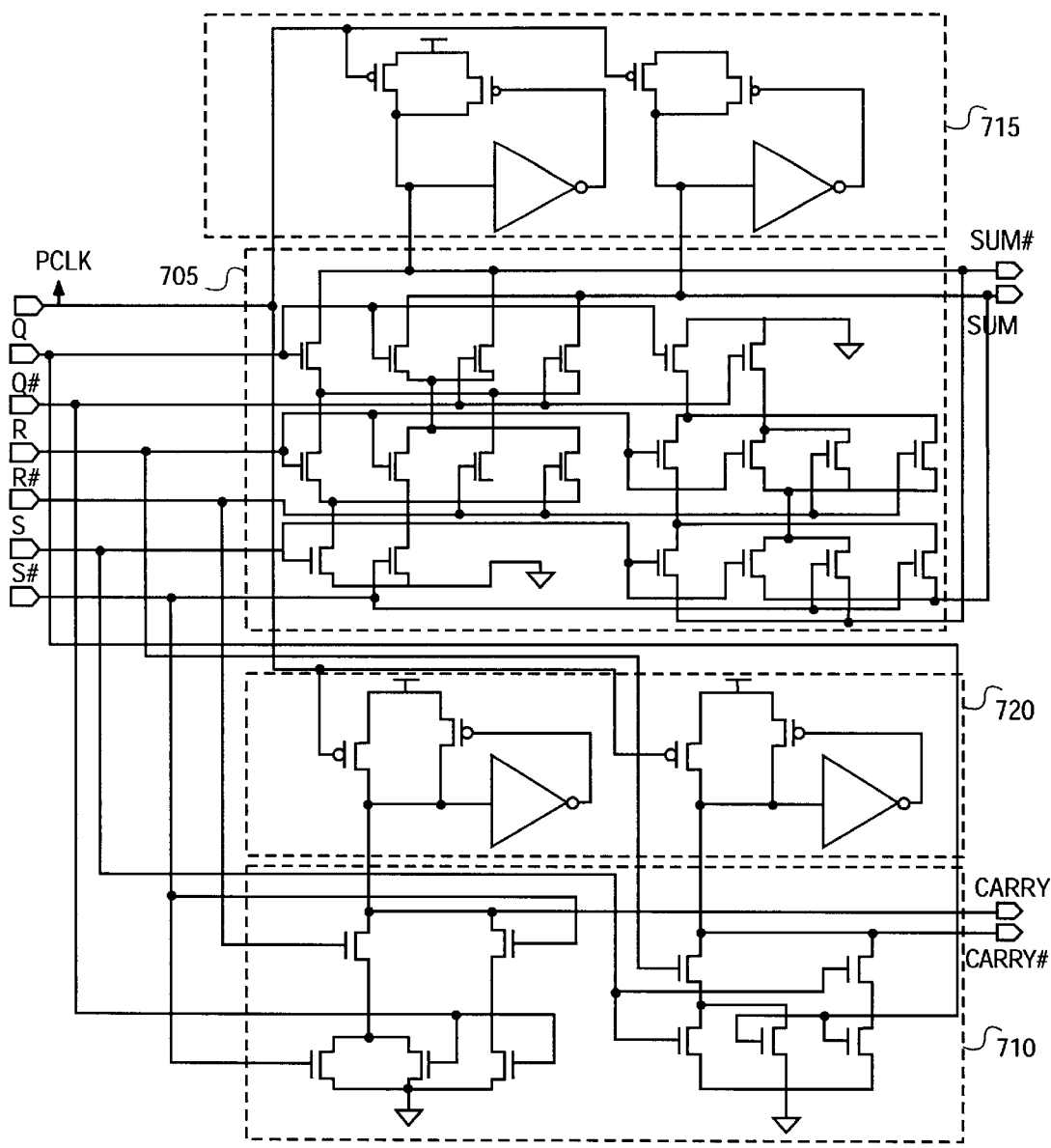
FIG. 7 is a schematic diagram of a full swing, differential domino 3 to 2 reducer circuit that may be used in the processor of FIG. 3.

For one embodiment, the full swing 3 to 2 reducer is implemented using differential domino logic as shown in FIG. 7. The full swing differential domino 3 to 2 reducer 700 includes sum logic 705, carry logic 710 and precharge and keeper circuits 715 and 720. The 3 to 2 reducer circuit 700 receives full swing differential input signal pairs Q, Q#, R, R#, S, and S# and provides full swing differential SUM and CARRY output signals according to the above equations. The differential domino 3 to 2 reducer 700 is a symmetric circuit (i.e. circuitry is duplicated) for this embodiment such that charge sharing may be reduced. A buffer stage (not shown) is included at the SUM and CARRY outputs.

In operation, the differential SUM and CARRY output signal lines are precharged high by precharge and keeper circuits 715 and 720 in response to an input clock signal pclk going low. The pclk signal is a precharge clock signal that may be derived from a processor 300 core clock signal, for example. For the embodiment shown in FIG. 7, the differential domino 3 to 2 reducer 700 is a D2-type circuit such that the input signals cannot be high when the circuit is in precharge. For other embodiments, a D1-type circuit may be used instead (i.e. a clock gate is included at the bottom of the domino stack) such that the inputs do not need to be restricted, but the circuit may then be slower.

As the pclk signal goes high, output data on the differential SUM and CARRY signal lines may be evaluated. The output data is responsive to input data received on the differential input signal lines Q, R and S according to the above SUM and CARRY signals. During the evaluate phase of operation, the keeper portion of the keeper circuit 715 and 720 operates to maintain the corresponding differential output signal lines to which they are coupled at a logic high value when the data on the respective signal line is a logic high value.

Similar to the low swing differential 3 to 2 reducer circuit(s) described above, the full swing 3 to 2 circuit 700 of FIG. 7 operates on one bit of a vector to be reduced. The circuit 700 may be replicated for the number of bits in the vectors to be reduced.

For another embodiment, the full swing 3 to 2 reducer 325 may be implemented using static CMOS logic to provide the same function.

The full swing output CARRY signal Y'(i) is left shifted by shift register (SR) 331 to provide the full swing signal Y(i). Both Y(i) and Z(i) are provided to the small signal 3 to 2 reducer 301 and to inverters 335 and 340, respectively. The inverters 335 and 340 provide the complement of the Y(i) and Z(i) signals to the small signal 3 to 2 reducer 301 to form the respective differential signals.

In parallel with the above-described operations, the ALU 310 may be performing one or more arithmetic operations to provide a vector A(i) at an output of the ALU 310. Additional vector sources 313(0 . . . n) may also provide vectors such as B(i) and N(i) at their outputs. The complements of these outputs may also be provided at outputs of inverters 355, 360 and 365. For one embodiment, the ALU 310 and the vector sources 313(0 . . . n) are relatively far away from the small signal mux 320 such that, by the time they are received by the small signal mux 320, they have reduced driving strength.

The small signal mux 320 is controlled by a control circuit (not shown) to selectively provide one differential small swing signal pair as output signals X(i) and X(i)# as shown. The control circuit may be responsive to various conditions within the processor 300, for example, to select different signal pairs at different times or for different operations. For one embodiment, the Y(i),Y(i)# and Z(i),Z(i)# signals are received by the small signal 3 to 2 reducer 301 before the X(i),X(l)# signals. In this manner, when the X(i) and X(i)# signals are received by the 3 to 2 reducer, it can perform the 3 to 2 reducing operation described above very quickly to provide differential small swing SUM and CARRY output signals. These SUM and CARRY output signals may then be recovered to provide corresponding full swing SUM and CARRY signals using sense amps as described above.

The full swing SUM and CARRY signals of this example represent bit(i) of the full linear address arrived at through the combination of the four input vectors Q, R, S and X. The remaining bits of the SUM and CARRY vectors may be arrived at in a similar manner using similar circuitry.

It will be appreciated that, while an IA-32 architecture processor is described in the example above, for other embodiments, a different type of integrated circuit, including a different type of processor of a different architecture, may also advantageously make use of the reducer circuit of various embodiments. Further, while the small swing 3 to 2 reducer is shown in an AGU, for other embodiments, the small swing 3 to 2 reducer may be advantageously implemented in other areas such as a floating point multiplier unit, for example.

In the above example, because the 3 to 2 reducer circuit 301 is a small signal circuit, it can perform the 3 to 2 reduction operation more quickly than a static CMOS or differential domino counterpart while also consuming less power. For prior AGU implementations similar to the AGU 305 of FIG. 3, but without the small signal 3 to 2 reducer, at least two clock cycles are typically consumed to combine four vectors to arrive at the full linear address. In the embodiment shown in FIG. 3, the full swing 3 to 2 reducer 325 may perform the first vector reduction operation to provide the Y and Z vectors at control inputs to the small signal 3 to 2 reducer while the ALU 310 is performing other time consuming operations. Then, when the vector X arrives at the small signal 3 to 2 reducer later in the same clock cycle, after the Y and Z control vectors are already set up, the 3 to 2 reduction operation to produce the final linear address can be performed very quickly. In this manner, for some embodiments, it may be possible to perform the entire 4 to 2 reduction operation in only one clock cycle.

As well as being fast, the reducer circuit of some embodiments is also smaller in area than static CMOS or differential domino counterparts and consumes less power due to the small swing signals used by the reducer circuit.

Figure 5:
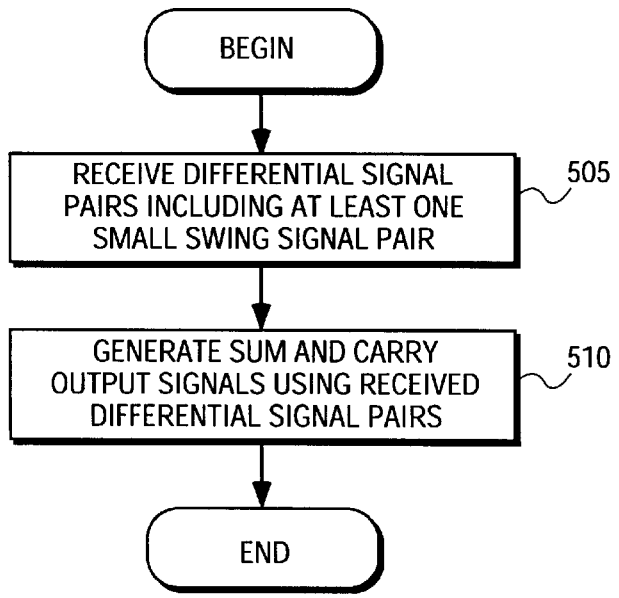
FIG. 5 is a flow diagram showing a method of one embodiment for reducing vectors from a first number of vectors to a second smaller number of vectors.
Figure 6:
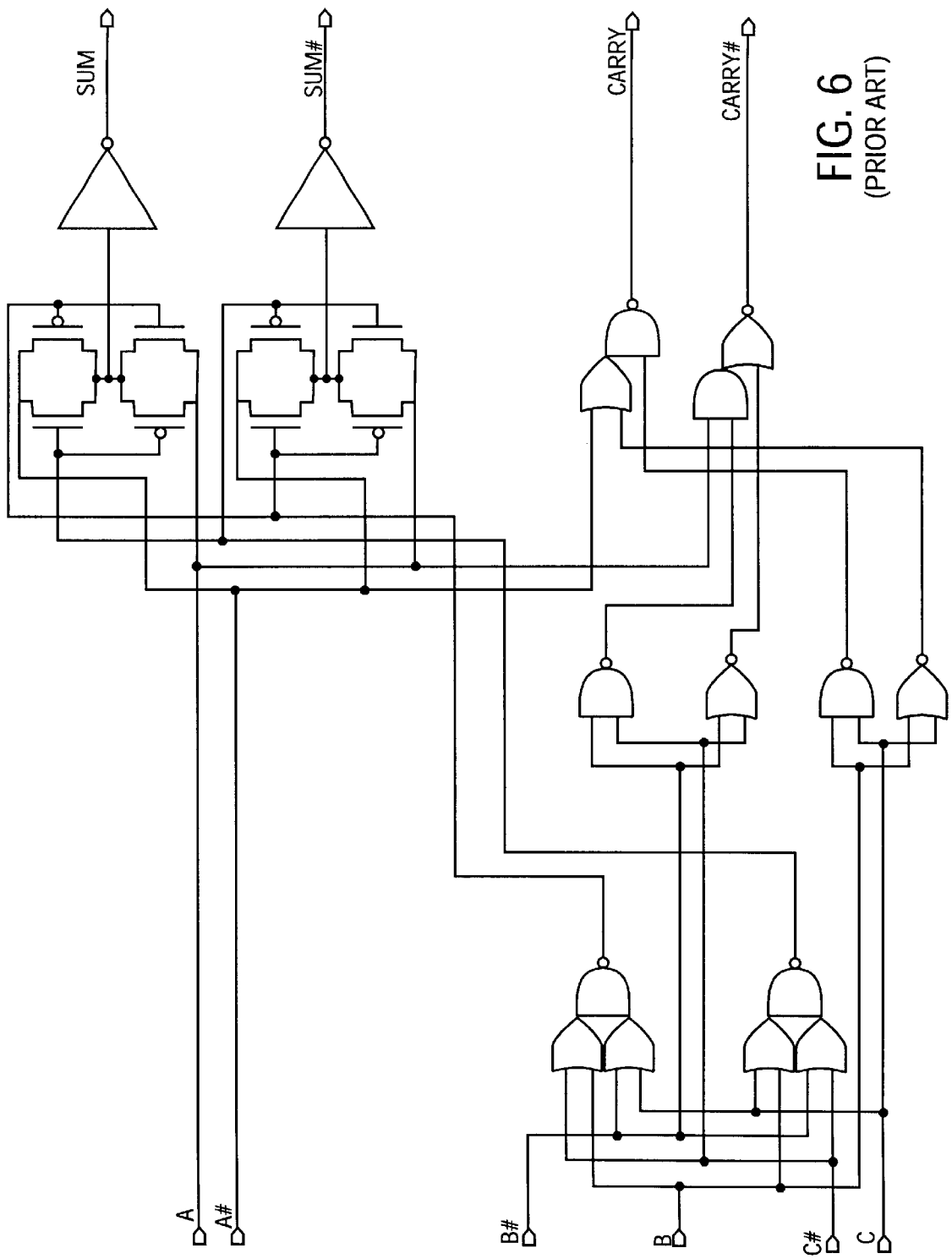
FIG. 6 is a schematic diagram of a prior static CMOS implementation of a 3 to 2 reducer circuit.

FIG. 5 is a flow diagram of a method of one embodiment for reducing a first number of vectors to a second smaller number of vectors. At block 505, a first number of differential signal pairs including at least one small swing signal pair is received. For one embodiment, the first number is at least three. At block 510, SUM and CARRY output signals are generated using the first number of signal pairs. For one embodiment, the SUM and CARRY output signals are differential small swing signals that may be sensed and amplified to provide corresponding full swing SUM and CARRY signals.

For other embodiments, the method may include additional actions such as, for example, receiving some signals from a prior full swing 3 to 2 reducer circuit and killing or regenerating a carry signal.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a first number of input terminals including at least two input terminals coupled to receive a differential small swing signal;
   a reducer circuit to generate differential, small swing SUM and CARRY output signals based on data received via the input terminals.

2. The apparatus of claim 1 further comprising:
   a second number of output terminals to provide the differential SUM and CARRY output signals, the second number being smaller than the first number.

3. The apparatus of claim 2 wherein the first number is six and the second number is four, and wherein the reducer circuit is a 3 to 2 reducer circuit.

4. The apparatus of claim 2 wherein
   the input terminals receive data X(i), Y(i) and Z(i) in differential signal form, and
   wherein the reducer circuit operates according to the equations:

$$\text{SUM}(i) = X(i) \text{ XOR } Y(i) \text{ XOR } Z(i)$$

$$\text{CARRY}(i) = X(i)*Y(i) + X(i)*Z(i) + Y(i)*Z(i).$$

5. The apparatus of claim 1 wherein at least one input terminal is coupled to receive a full swing signal.

6. The apparatus of claim 5 wherein the reducer circuit includes at least one small signal XOR cell.

7. The apparatus of claim 6 wherein the small signal XOR cell includes at least one pass gate, the pass gate having one terminal coupled to receive the small swing signal and having a gate coupled to be controlled by the full swing signal.

8. The apparatus of claim 1 further comprising:
   kill carry logic coupled to the reducer circuit, the kill carry logic to cause the CARRY output signal to indicate a logical 0 regardless of data received at the input terminals.

9. The apparatus of claim 1 further comprising:
   regenerate logic coupled to the reducer circuit, the regenerate logic to cause the CARRY output signal to indicate a logical 1 regardless of data received at the input terminals.

10. The apparatus of claim 1 further including
    a first sense amplifier coupled to receive the differential, small swing SUM output signals, the first sense amp to provide a corresponding full swing SUM output signal; and
    a second sense amplifier coupled to receive the differential, small swing CARRY output signals, the second sense amp to provide a corresponding full swing CARRY output signal.

11. The apparatus of claim 10 wherein the first and second sense amplifiers are enabled in response to a clock signal transition in a first direction, and wherein the reducer circuit includes at least one equalizer device that is enabled to equalize internal nodes in the reducer circuit in response to the clock signal transition in a second, different direction.

12. A method comprising:

receiving a first number of differential signal pairs including at least one small swing signal pair, the first number being at least three; and generating differential, small swing SUM and CARRY output signals responsive to receiving the first number of signal pairs.

13. The method of claim 12 further comprising:

sensing the differential small swing SUM and CARRY output signals; and amplifying the SUM and CARRY output signals to provide corresponding full swing SUM and CARRY output signals.

14. The method of claim 13 wherein receiving includes receiving at least one signal pair from a full swing reducer circuit.

15. The method of claim 12 further including:

killing a carry signal.

16. The method of claim 12 further including:

regenerating a carry signal.

17. A 3 to 2 reducer circuit comprising:

a first set of control inputs to receive at least one full swing differential input signal pair;

a second set of inputs to receive at least one small swing differential input signal pair;

logic to provide small signal, differential SUM and CARRY output signals based on data indicated by the input signals received at the first and second sets of inputs.

18. The 3 to 2 reducer circuit of claim 17 wherein the first set of control inputs receives two full swing differential input signal pairs Y and Z, the second set of inputs receives one small swing differential input signal pair X, and the logic operates according to the equations:

SUM=$X$ XOR $Y$ XOR Z

CARRY=$X^*Y+X^*Z+Y^*Z$.

19. The 3 to 2 reducer of claim 18 further comprising:

kill carry logic to cause the CARRY signal to indicate a logical 0 regardless of data indicated by the input signals.

20. The 3 to 2 reducer of claim 17 wherein the logic includes SUM logic including two cascaded small signal XOR cells, the small signal XOR cells being coupled to be controlled by signals received over the first set of control inputs.

21. The 3 to 2 reducer of claim 20 wherein the small signal XOR cells include a pass gate having a terminal coupled to receive part of the small swing differential input signal pair and a gate coupled to be controlled by part of the full swing differential input signal pair.

22. The 3 to 2 reducer of claim 17 wherein the logic includes

CARRY logic that includes combinatorial logic and a small signal XOR cell, the small signal XOR cell being coupled to receive the small swing differential input signal pair.

23. A processor comprising:

a full swing reducer circuit; and a small swing reducer circuit cascaded with the full swing reducer circuit, the cascaded full and small swing reducer circuits to reduce portions of four or more input vectors to corresponding differential, small swing SUM and CARRY output vectors.

24. The processor of claim 23 further including an address generation unit, the address generation unit including the full and small swing reducer circuits.

25. The processor of claim 24 further comprising:

first and second sense amplifiers coupled to receive the differential SUM and CARRY output vectors, respectively, the first and second sense amps to provide corresponding full swing SUM and CARRY signals.

26. The processor of claim 25 wherein the SUM and CARRY signals indicate a full linear address.

27. The processor of claim 23 further including:

a small swing multiplexer to provide a differential small swing input signal pair to the small swing reducer circuit, the small swing multiplexer being coupled to receive vectors from multiple sources.

28. The processor of claim 23 wherein the small swing reducer circuit receives full swing differential control signals and at least one differential, small swing input signal pair.

* * * * *

UNITED STATES PATENT AND TRADEMARK OFFICE
CERTIFICATE OF CORRECTION

PATENT NO. : 6,732,136 B1　　　　　　　　　　　　　　　　　　　　　　　Page 1 of 1
DATED : May 4, 2004
INVENTOR(S) : Chen et al.

It is certified that error appears in the above-identified patent and that said Letters Patent is hereby corrected as shown below:

<u>Column 2,</u>
Lines 58 and 62, delete "1110" and insert -- 110 --.

Signed and Sealed this

Sixth Day of July, 2004

JON W. DUDAS
*Acting Director of the United States Patent and Trademark Office*